United States Patent
Barkley et al.

(10) Patent No.: US 7,460,855 B2
(45) Date of Patent: Dec. 2, 2008

(54) SELECTIVE PRE-AUTHENTICATION TO ANTICIPATED PRIMARY WIRELESS ACCESS POINTS

(75) Inventors: Warren V. Barkley, Millcreek, WA (US); Arun Ayyagari, Seattle, WA (US); Timothy M. Moore, Bellevue, WA (US); Andrew Thomas Baron, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 10/453,762

(22) Filed: Jun. 3, 2003

(65) Prior Publication Data

US 2004/0248553 A1    Dec. 9, 2004

(51) Int. Cl.
*H04M 1/66* (2006.01)
(52) U.S. Cl. .................... 455/411; 455/435; 455/435.1; 455/435.2; 455/435.3; 455/436; 455/442; 455/421
(58) Field of Classification Search ................. 455/411, 455/435–444, 500, 501, 502, 524, 525; 370/331–333
See application file for complete search history.

(56) References Cited

U.S. PATENT DOCUMENTS

| | | | | |
|---|---|---|---|---|
| 5,724,346 | A * | 3/1998 | Kobayashi et al. | 370/329 |
| 6,119,179 | A * | 9/2000 | Whitridge et al. | 710/72 |
| 6,125,364 | A * | 9/2000 | Greef et al. | 707/130 R |
| 6,504,828 | B1 * | 1/2003 | Corbett | 370/331 |
| 7,161,914 | B2 * | 1/2007 | Shoaib et al. | 370/331 |
| 2003/0016655 | A1 | 1/2003 | Gwon | 370/352 |

FOREIGN PATENT DOCUMENTS

| | | |
|---|---|---|
| CN | 1357207 A | 7/2002 |
| EP | 1 289 223 | 3/2003 |
| WO | WO 02/091679 | 11/2002 |

OTHER PUBLICATIONS

Harry Newton, Newton's Telecom Dictionary, Oct. 1998, Telecom Books, 14th Edition, pp. 717, 817, 818, 830-831, & 841.*
Harry Newton, Newton's Telecom Dictionary, Feb. 2002, CMP Books, 18th Edition, pp. 17-18, 104, 834, & 777-778.*
Wen-Tsuen, Chen, et al., "Some Mechanisms to Improve TCP/IP Performance over Wireless and Mobile Computing Environment" Parallel and Distributed Systems, 2000; Seventh International Conference on Iwate, Japan Jul. 4-7, 2000; Los Alamitos, CA, IEEE Comput. Soc., Jul. 4, 200, pp. 437-444.

(Continued)

*Primary Examiner*—Charles N Appiah
*Assistant Examiner*—Randy Peaches
(74) *Attorney, Agent, or Firm*—Workman Nydegger

(57) ABSTRACT

A wireless device that adaptively makes the determination of whether or not to pre-authenticate. If the wireless device is running an application that is sensitive to latency (also referred to herein as a low latency application), then pre-authentication is performed and latency is reduced during the switch between wireless access points. Such low latency applications may include voice over IP, video, interactive whiteboard, or video teleconferencing. On the other hand, if the wireless device is not running a low latency application, the wireless device is less susceptible to latency when making the wireless access point switch. In that case, pre-authentication is not performed and processing and battery resources are preserved.

15 Claims, 3 Drawing Sheets

OTHER PUBLICATIONS

Gopal, Ram, et al., "Policy Based Access Router Selections and Context Transfers in Mobile IP Network" Conference on Network Control and Engineering for Quality of Service, Security and Mobility Oct. 23, 2002, pp. 3-14.

Pack, Sangheon, et al., "Pre-Authenticated Fast Handoff in a Public Wireless LAN Based on IEEE 802.1x Model" Computer Science and Engineering, Seoul National University, Online! 2002, pp. 1-8.

* cited by examiner

SELECTIVE PRE-AUTHENTICATION TO ANTICIPATED PRIMARY WIRELESS ACCESS POINTS

BACKGROUND OF THE INVENTION

1. The Field of the Invention

The present invention relates to wireless networking technology. More specifically, the present invention relates to mechanisms for selectively pre-authenticating to anticipated primary wireless access points even before an anticipated wireless access point becomes an actual primary wireless access point.

2. Background and Related Art

Computers now come in a wide variety of forms including desktop computers, laptop computers, tablet PCs, Personal Digital Assistants (PDAs), telephones, and even smaller devices. Such devices may have the ability to communicate over a wireless network. In this specification and claims, a "wireless device" is any device that is capable of communicating over one or more wireless networks even if that device is also capable of communicating over a wired network.

The ability to communicate over a wireless network has become a popular attribute of computers. Accordingly, wireless devices are now spread throughout the globe. The ability to connect to a wireless network is particularly useful for portable computing devices as wireless networks typically allow the portable computing devices to be moved greater distances and with far less restriction that it would if physically connected to a wired network.

One device that greatly increases the utility of wireless devices is a wireless access point. The wireless access point allows wireless devices that are within its range (and that are properly configured and authorized) to access a wired network connected to the wireless access point. The wired network may be a local area network, or even a wide area network such as the Internet. Wireless access points thus tend to be more fixed in space than are the portable wireless devices they support.

Often, when a user moves a wireless device around, the wireless device moves from an area supported by one wireless access point to an area supported by another wireless access point. In order to make the switch from one wireless access point to another, the roaming wireless device often waits until the association with the prior wireless access point is broken before associating with and authenticating to the new wireless access point. Accordingly, there is latency time between the time the wireless device disassociates with the prior wireless network and the time the wireless device successfully authenticates to the new wireless device.

In order to reduce this latency time, it has been proposed that authentication to potential wireless access points be performed even before that potential wireless access point becomes the primary wireless access point. This allows for reduced latency time when it comes time to switch between the prior wireless access point and a new wireless access point that has been pre-authenticated to. This is because after the wireless device disassociates with the prior wireless access point, the wireless device only needs to associate with the new wireless access point, but does not need to authenticate.

Of course, there may be times that a wireless device pre-authenticates with a wireless access point that never actually becomes a primary wireless access point. After all, it is often difficult to predict when a wireless device will begin using a primary wireless access point since the movement of the wireless device is subject to unpredictability in the movement of its associated user. If the anticipated primary wireless access point does not actually become the primary wireless access point, the pre-authentication process represents wasted processor cycles, power and unnecessary load on authentication servers.

Mobile wireless devices sometimes have limited processor and battery resources as compared to their larger counterparts. Accordingly, what would be advantageous are mechanisms that allow for pre-authentication before switching between wireless access points, while having reduced processor and power requirements.

BRIEF SUMMARY OF THE INVENTION

The foregoing problems with the prior state of the art are overcome by the principles of the present invention which are directed towards a wireless device that selectively pre-authenticating as appropriate given the latency demands of applications running on the wireless device.

While communicating with a prior wireless access point, the wireless device determines that a next wireless access point is within range and may potentially be communicated with in the future. The wireless device determines that one or more applications running on the wireless device require low latency when switching from one wireless access point to another. In response, the wireless device indicates to the next wireless access point that the wireless device is to acquire an authenticated state with the next wireless access point even prior to making the second wireless access point a primary wireless access point. There may be multiple next wireless access points within range, in which case, the wireless device may acquire the authenticated state with these multiple next wireless access points.

Note that the wireless device adaptively makes the determination of whether or not to pre-authenticate. If the wireless device is running an application that is sensitive to latency (also referred to herein as a low latency application), then pre-authentication is performed and latency is reduced during the switch between wireless access points. Such low latency applications may include voice over IP, video, interactive whiteboard, or video teleconferencing. On the other hand, if the wireless device is not running a low latency application, the wireless device is less susceptible to latency when making the wireless access point switch. In that case, pre-authentication is not performed and processing and battery resources are preserved. Accordingly, pre-authentication is performed when it is important, and not performed thereby preserving processing and battery resources when pre-authentication is not important.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a wireless device that adaptively makes the determination of whether or not to pre-authenticate. If the wireless device is running an application that is sensitive to latency (also referred to herein as a low latency application), then pre-authentication is performed and latency is reduced during the switch between wireless access points. Such low latency applications may include voice over IP, video, interactive whiteboard, or video teleconferencing. On the other hand, if the wireless device is not running a low latency application, the wireless device is less susceptible to latency when making the wireless access point switch. In that case, pre-authentication is not performed and processing and battery resources are preserved.

The embodiments of the present invention may include a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Figure 1:
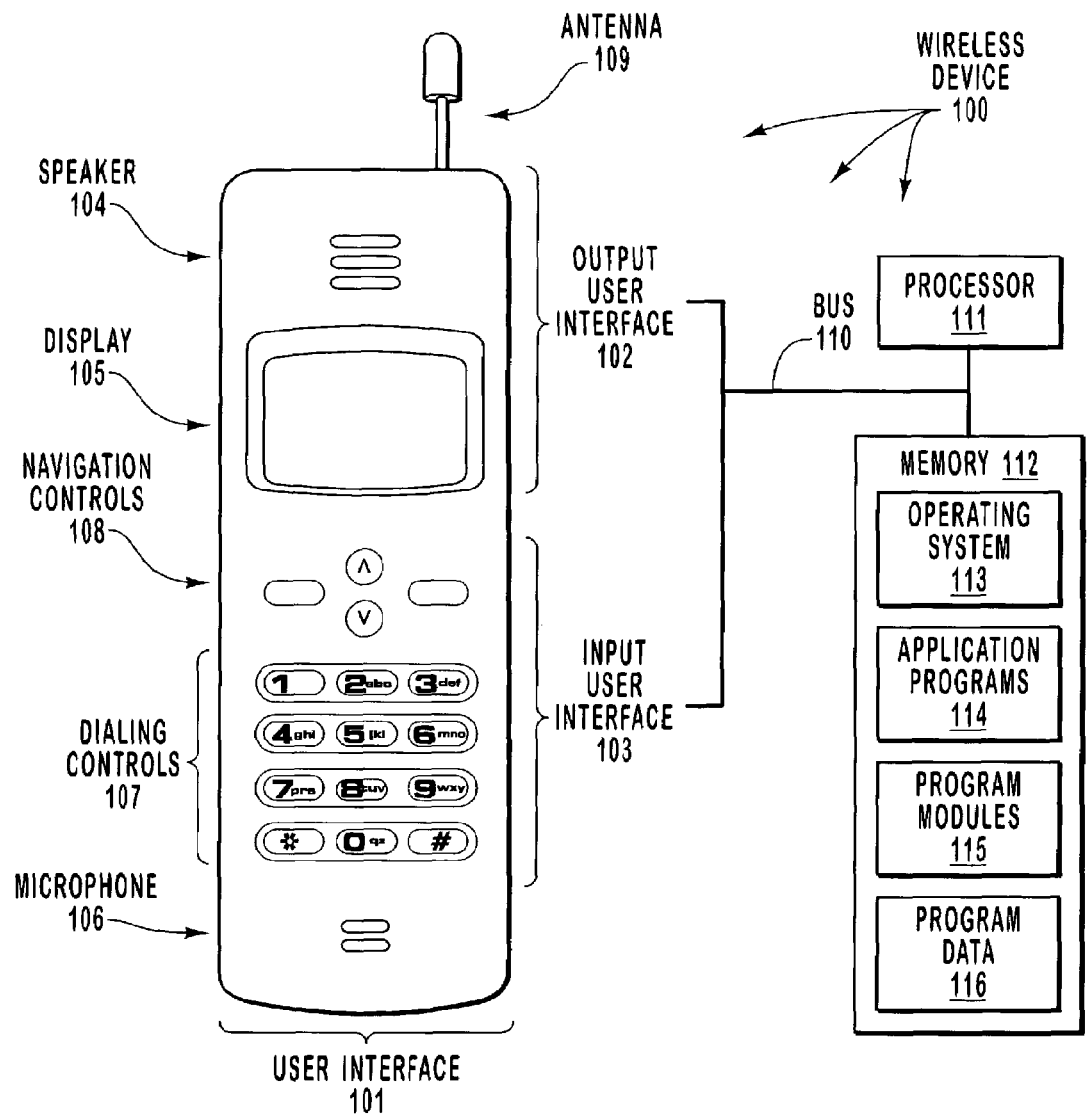
FIG. 1 illustrates a suitable wireless device in which the principles of the present invention may operate.

FIG. 1 and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types.

With reference to FIG. 1, a suitable operating environment for the principles of the invention includes a general purpose computing device in the form of a wireless device 100. Although the wireless device 100 has the appearance of a mobile telephone, a wide-variety of devices are now capable of communicating over a wireless network and may benefit by employing the principles of the present invention. For example, tablet PCs, Personal Digital Assistants (PDAs), laptops, and other wireless devices are now available. Other wireless device forms may be developed in the future. The principles of the present invention are not limited to the particular form of the wireless device.

The wireless device 100 includes a user interface 101 for allowing a user to input information through an input user interface 103. The user reviews information presented via an output user interface 102. The user interface will vary widely depending on the form factor of the wireless device. In the illustrated embodiment, however, in which the wireless device 100 is a wireless telephone, the output user interface 102 includes a speaker 104 for presenting audio information to the user, as well as a display 105 for presenting visual information to the user.

The input user interface 103 may include a microphone 106 for rendering audio information into electronic form. In addition, the input user interface 103 includes dialing controls 107 and navigations controls 108 that allow the user to input information into the wireless device 100. Although the speaker 104 and the microphone 106 are illustrated as external, the speaker and microphone would typically be integrated with and/or internal to the wireless device 100.

Program code means comprising one or more program modules may be stored in a memory 112. The one of more program modules may include an operating system 113, one or more application programs 114, other program modules 115, and program data 116. The one or more program modules may be instantiated in the memory (if volatile), or loaded from memory (if non-volatile) and then further processed using a processor 111. The program code means may include non-volatile as well as volatile memory and its form may vary greatly depending on the type of wireless device. A bus 110 interconnects the user interface 101, the processor 111, and the memory 112.

While FIG. 1 represents a suitable operating environment for the present invention, the principles of the present invention may be employed in any wireless device that is capable of communicating over a wireless network. The wireless device illustrated in FIG. 1 is illustrative only, and by no means represents even a small portion of the wide variety of wireless devices in which the principles of the present invention may be implemented.

Figure 2:
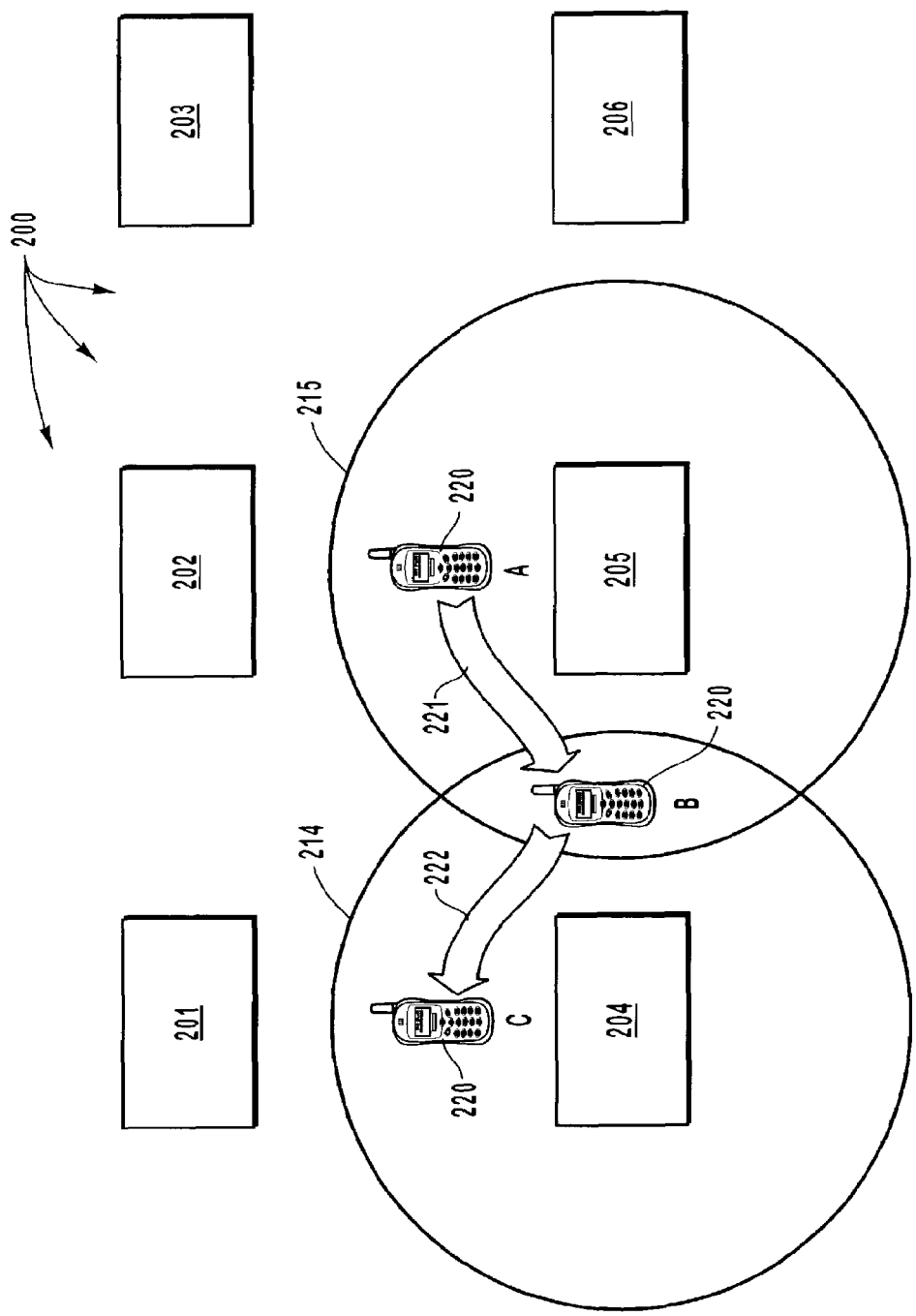
FIG. 2 illustrates a suitable wireless network environment in which the principles of the present invention may operate in which a wireless device may wander through the range served by a number of wireless access points.

FIG. 2 illustrates a wireless network environment 200 in which the principles of the present invention may operate. The network environment 200 includes a number of wireless access points 201 through 206. Each wireless access point will be able to serve suitably configured wireless devices within a certain range. The wireless access point may serve surrounding wireless devices using any wireless communication protocol such as, for example, IEEE 802.11, any successor 802.11 protocol, Bluetooth technology, Personal Area Networks (PAN) using Ultra Wide Band (UWB) technology, and even wireless Wide Area Networks such as GPRS technology. The range of wireless access point 204 is illustrated by circle 214, while the range of wireless access point 205 is illustrated by circle 215. The other wireless access points 201 through 203 and 206 will also have a range. A wireless device 220 roams within the wireless network 200 and may (but need not) have the structure described above for the wireless device 100 of FIG. 1.

For clarity, the ranges 214 and 215 are illustrated as being approximately circular and approximately centered at the associated wireless access point. However, those of ordinary skill in the art will recognize that wireless access points may have a variety of range shapes depending on the type and orientation of the antenna(s) of the wireless access point, and any physical obstacles within the range or otherwise confining the range. In an unobstructed area, a wireless access point with an omnidirectional antenna will take the approximate form of a sphere.

As is often the case, a wireless device is often mobile and thus may travel from an area served by one wireless access point to an area served by another wireless device. In that case, the wireless device often switches wireless access points. For instance, wireless device 220 is illustrated in FIG. 2 as traveling from point A (which is clearly within the range of wireless access point 205) to point B (which is within the range of both wireless access points 204 and 205) as represented by arrow 221. The wireless device 220 may move even further from point B to point C (which is clearly within the range of wireless access point 204, but no longer within the range of wireless access point 205). Accordingly, at some point in this process while the wireless device is within the range of both the wireless access points 204 and 205, the wireless device 220 will switch wireless access points.

Figure 3:
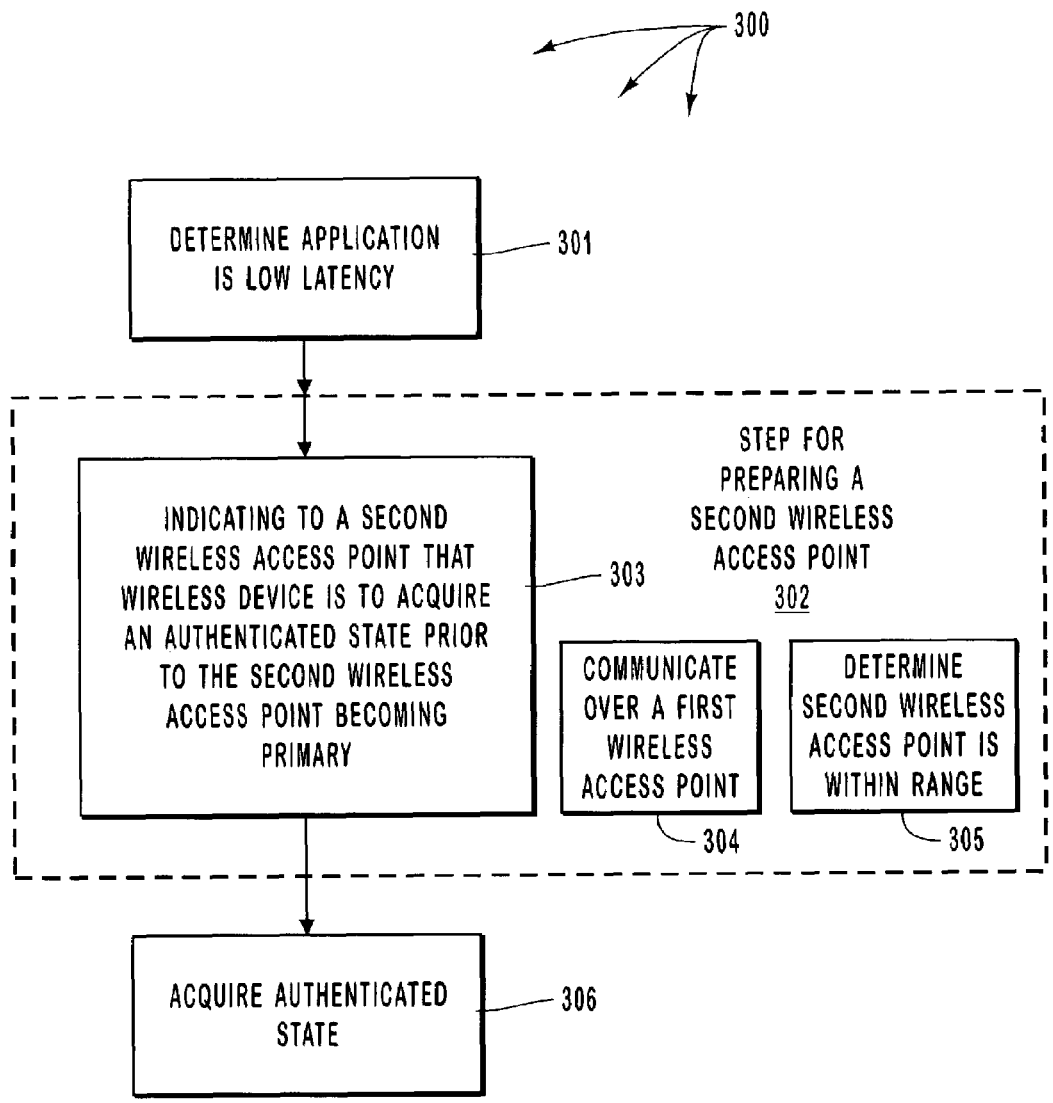
FIG. 3 illustrates a flowchart of a method for a wireless device to transfer from one wireless point to another while selectively pre-authenticating based on the latency sensitivity of the applications running on the wireless device.

FIG. 3 illustrates a flowchart of a method 300 for a wireless device to transfer from one wireless access point to another wireless access point in accordance with the principles of the present invention. As the method 300 may be implemented as the wireless device 220 travels from point A to point C illustrated in FIG. 2, the method 300 will be described with frequent reference to the network environment 200 of FIG. 2.

The wireless device determines that an application that is currently running on the wireless device is to have low latency when transferring from one wireless access point to another (e.g., 301). The application need not have a user interface but may be any software component (e.g., a device driver, and operating system component or the like). Furthermore, this determination may be made internally by an application on the wireless device or in response to an indication from an independent agent internal or external to the wireless device. Some applications are more sensitive to latency requirements and will be referred to herein as low latency applications. Such low latency applications include, for example, voice over IP, video, interactive whiteboard, video teleconferencing, or streaming applications (e.g., music streaming) especially if those streaming applications have limited buffering capability. The wireless device 220 may make this determination in response to an express statement by the application, or may simply infer the same based on an identification of the application. For example, the wireless device may maintain a list of application identifiers associated with those applications that are (or are not) low latency applications.

The method 300 also includes a functional, result-oriented step for preparing a second wireless access point (e.g., wireless access point 204) such that the wireless device (e.g., wireless device 220) has an authenticated state with the second wireless access point prior to disassociating with a first wireless access point (step 302). This step may be performed for each of multiple wireless access points if there are multiple access points available to the wireless device. This functional, result-oriented step may include any corresponding acts for accomplishing this result. However, in the illustrated embodiment, the step 302 includes corresponding acts 303, 304 and 305.

Specifically, in response to the determination or indication that the application is to have low latency, the wireless device 220 indicates to the second wireless access point 204 that the wireless device 220 is to acquire an authenticated state with the second wireless access point prior to making the second wireless access point 204 a primary wireless access point (act 303). In the case where the wireless device 220 is a trusted device and the wireless access points 201 through 206 are within a common sphere of trust, the wireless device 220 may be pre-registered (act 306) with the wireless access points 201 through 206. Part of this pre-registration process may involve the wireless device 220 providing suitable credentials to each of the wireless access points and/or to an authentication service that the wireless access points trust. This option is hereinafter also referred to as the "pre-registration" option.

Alternatively, the wireless device 220 could perform act 303 by issuing an authentication request to the new wireless access point 204 even while the wireless device continues to communicate with the prior wireless access point 205. In other words, the wireless device 220 authenticates with new wireless access points on the fly as it is being moved from one wireless access point to another. This option is hereinafter also referred to as the "pre-authentication" option.

In either case, after indicating that the wireless device 220 is to acquire the authenticated state (act 303), the wireless device 220 acquires the authenticated state with the second wireless access point 204 (act 306). Under the pre-registration option, the wireless device 220 may acquire the authenticated state (act 306) well before communicating over the first wireless access point (act 304) and well before the wireless device 220 detects that it is also within range of the second wireless access point (act 305).

The pre-authentication option may be more often used when the wireless access points 201 through 206 do not share a common sphere of trust, or are not in an area frequently visited by the wireless device 220. On the other hand, the pre-registration option may be more often used when the wireless access points 201 through 206 do share a common sphere of trust or are in an area often visited by the wireless device 220.

The step 302 also includes an act of the wireless device 220 communicating over a first wireless access point such as wireless access point 205 (act 304). When implementing the pre-authentication option, the wireless device 220 may communicate over the first wireless access point (act 304) concurrently while indicating to the second wireless access point 204 that the wireless device 220 is to acquire an authenticate state with the second wireless access point 204 (act 303).

The step 302 also includes an act of determining that the second wireless access point 205 is within range (act 305) and may potentially be communicated with in the future even though the wireless device is currently communicating with the first wireless access point. Under the pre-registration option, the wireless device 220 may have indicated to the second wireless access point 204 that that wireless device 220 is to acquire an authenticated state with the second wireless access point 204 (act 303) well in advance of when the wireless device 220 detects that the second wireless access point 204 is within range (act 305).

After the step for preparing a second wireless access point (step 302), the wireless access point 220 then associates with the second wireless access point 204. The wireless device 220 acquires the authenticated state with the second wireless access point 204 before the wireless device 220 is disassociated with the first wireless access point 205. Accordingly, after disassociating with the first wireless access point 205, the wireless device need only associate with the second wireless access point 204. There is no need to authenticate with the second wireless access point 204 after disassociating with the first wireless access point 205.

Thus, there is less latent time between the time that the wireless device 220 may communicate over the first wireless access point 205 and the time that the wireless device 220 may communicate with the second wireless access point 204. With the reduced latent time, low latency applications are better served even while the wireless device is mobile and transitioning from one wireless access point to the next. Furthermore, the pre-authentication or pre-registration process may be selectively implemented as appropriate given the latency requirements of the then running applications on the wireless device. Accordingly, the battery power associated with pre-registration and pre-authentication need only be expended when an applications needs that battery power.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All (changes, which come within the meaning and range of equivalency of the claims, are to be embraced within their scope.

What is claimed and desired secured by United States Letters Patent is:

1. At a wireless device connected to a wireless network, the wireless network having a plurality of wireless access points that can be used to access the wireless network, the wireless device configured to associate with wireless access points to access resources of the wireless network, a method for the wireless device to prepare a wireless access point to associate with the wireless device prior to but in anticipation of the wireless device subsequently associating with the wireless access point, the method comprising:

an act of the wireless device associating with a first wireless access point to access the wireless network, including configuring applications at the wireless device to communicate over the first wireless access point;

an act of an application at the wireless device communicating over the first wireless access point;

an act of the wireless device detecting that the wireless device is within range of a plurality of other wireless access points providing access to the wireless network;

act of anticipating that the wireless device is to subsequently transition to a next wireless access point from among the plurality of the other wireless access points based on the wireless device being within range of each of the plurality of other second wireless access points;

an act of identifying latency requirements for the application in response to the anticipated transition to one of the other wireless access points;

an act of determining that the latency requirements of the application are likely to be violated if authentication with the next wireless access points is performed at the time the wireless device transitions to the next wireless access points; and in response to the determination, and prior to the wireless device disassociating with the first wireless access point:

an act of the wireless device pre-authenticating the wireless device directly with the next wireless access point to obtain an authenticated state with the next wireless access point in preparation for the anticipated transition by the wireless device to the next wireless access point so as to decrease the likelihood of violating the identified latency requirements of the application upon transitioning the application to the next access point; and an act of the wireless device concurrently communicating with the first wireless access device concurrent to the wireless device pre-authenticating with the next wireless access point.

2. A method in accordance with claim 1, wherein the act of identifying the latency requirements of the application comprises the following:

an act of receiving a request from the application to authenticate with anticipated primary wireless access points prior to making the anticipated primary wireless access point a primary wireless access point.

3. A method in accordance with claim 1, wherein the application is voice over IP.

4. A method in accordance with claim 1, wherein the application is a video application.

5. A method in accordance with claim 1, wherein the application is an interactive whiteboard.

6. A method in accordance with claim 1, wherein the application is a video teleconferencing application.

7. A method in accordance with claim 1, wherein the application is a streaming application.

8. A method in accordance with claim 1, wherein each of the plurality of wireless access points are within a common sphere of trust.

9. A method as recited in claim 1, wherein the wireless device maintains a list of application identifiers distinguishing between applications that are low latency applications and applications that are high latency applications.

10. A computer program product for implementing a method for a wireless device to prepare wireless access point to associate with the wireless device prior to but in anticipation of the wireless device subsequently associating with the wireless access point, the computer program product comprising one or more computer-readable media having thereon computer-executable instructions that, when executed by one or more processors, cause the wireless device to perform the method recited in claim 1.

11. A computer program product in accordance with claim 10, wherein the computer-executable instructions for identifying the latency requirements of the application comprise computer-executable instructions that, when executed by the one or more processors, cause the wireless device to perform the following:

an act of detecting receipt of a request from the application to authenticate with anticipated primary wireless access points prior to associating with the anticipated primary wireless access point.

12. A computer program product in accordance with claim 10, wherein each of the plurality of wireless access points are within a common sphere of trust.

13. A computer program product in accordance with claim 10, wherein the computer-executable instructions for performing the act of the wireless device communicating over the first wireless access point comprise the computer-executable instructions that, when executed by one or more processors, cause the wireless device to perform the following:

an act of communicating with the first wireless access point using Personal Area Networks.

14. A computer program product in accordance with claim 10, wherein the one or more computer-readable media are persistence memory media.

15. A computer program product in accordance with claim 10, wherein the one or more computer-readable media are volatile memory media.

* * * * *